United States Patent Office 3,272,793
Patented Sept. 13, 1966

3,272,793
QUATERNARY AMMONIUM SALTS OF HALO-
HYDRIN ETHER DYESTUFFS
David Taber, Wilmette, Ill., Edgar E. Renfrew, White
Bear Lake, Minn., and Henry W. Pons, Lock Haven,
Pa., assignors to American Aniline Products, Inc., a
corporation of Delaware
No Drawing. Filed June 22, 1964, Ser. No. 377,087
5 Claims. (Cl. 260—156)

This application is a continuation-in-part of our copending application Serial No. 160,332, filed December 18, 1961, and now abandoned.

This invention relates to new dyestuffs and to the coloring of cellulosic and other textile materials therewith. In one specific aspect, it relates to new water-soluble dyestuffs having directly attached thereto in the same aromatic ring at least two quaternary ammonium salt groups which are derived from halohydroxyalkoxy groups.

In recent years there has been considerable interest in the manufacture of water-soluble dyestuffs containing triazine or pyrimidine rings to which there are attached reactive halogen atoms. These classes of dyestuffs are believed to react with the functional groups of cellulosic and other fibers and, as a result, give colorations which are extremely resistant to wet treatments. The dyestuffs must contain at least one ionogenic solubilizing group, e.g., a sulfonic acid or carboxylic acid group, to make them sufficiently water-soluble to be applied from an aqueous bath. The requirement for at least one sulfonic acid or carboxylic acid group thus imposes a limitation on the type of colored compound that can be used to synthesize the dyestuffs.

We have found that unexpectedly superior water-soluble dyestuffs can be made from water-insoluble dyestuffs, free of ionogenic solubilizing groups, by converting water-insoluble dyestuffs, having attached directly to one aromatic ring at least two halohydroxyalkoxy groups, to their corresponding quaternary ammonium salts. Our new dyestuffs, when applied to cellulosic or other textile materials by dyeing or printing in the presence of an acid-binding agent, react with the fiber to give bright colorations which have good wash-fastness.

It is an object of the present invention to provide a new class of water-insoluble dyestuffs solubilized by the presence of at least two groups comprising a quaternary ammonium salt of a halohydroxyalkoxy group, at least two of these groups being directly attached to the same aromatic ring of the dyestuff moiety.

In accordance with the invention, we have discovered dyestuffs of the formula:

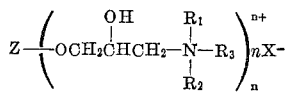

wherein Z is a water-insoluble aromatic dyestuff moiety of the azo or anthraquinone series, as recognized by the Colour Index, 2nd edition, 1956; $n$, the number of reactive functional groups, is a small whole number having a value of from 1 to 4; $R_1$, as an individual substituent, is a member selected from the group consisting of lower alkyl and phenyl; $R_2$ and $R_3$, as individual substituents, are lower alkyl; and $R_1$, $R_2$ and $R_3$ taken collectively, represent the residue of an azaaromatic nucleus selected from the group consisting of pyridine, methylpyridines, quinoline and isoquinoline; and X is chlorine or bromine. The Z term, representing the dyestuff moiety, is free of ionogenic solubilizing groups. The oxygen atom of at least two of the $n$ functional groups is linked directly to one aromatic ring of the Z moiety.

The new dyestuffs can be made by the interaction of one mole of a hydroxyl-containing water-insoluble colorant of the azo or anthraquinone series with at least one mole of epichloro- or epibromohydrin per hydroxyl group to form a water-insoluble halohydrin ether dyestuff intermediate. This intermediate is converted to its water-soluble quaternary ammonium salt by reacting it with a tertiary amine.

In lieu of the epichloro- or epibromohydrin used to prepare the 2-hydroxy-3-halopropoxy intermediates, the hydroxyl-containing colorants can be reacted with an allyl halide, e.g., allyl chloride or allyl bromide, to form an allyl amine which, by reaction with hypobromous or hypochlorous acid, is converted to an intermediate useful in the invention.

The water-insoluble hydroxyl-containing colorants of the azo series suitable for making the dyestuffs of the invention are made by coupling, with any suitable coupling component, a di- or polyhydric phenol, such as resorcinol, 4-chlororesorcinol, 4-methylresorcinol, pyrogallol, 1,3-naphthalenediol, 2,3-naphthalenediol, alkyl-substituted naphthalenediols, 2,4-quinolinediol and the like.

Specific useful hydroxyl-containing colorants include, but are not limited to, picramic acid→resorcinol; picramic acid→2,3-naphthalenediol; picramic acid→pyrogallol; aniline→1,3 - naphthalenediol; o - toluidine→resorcinol; p-phenetidine→resorcinol; aniline→resorcinol; 2-amino-4-nitrophenol→resorcinol; aniline→pyrogallol; p-nitroaniline→pyrogallol; N,N-dimethyl-p-phenylenediamine→pyrogallol; p-aminophenol→pyrogallol; o-nitroaniline→resorcinol; p-nitroaniline→resorcinol; 2,4-dinitroaniline→resorcinol; 5 - chloro-2 - nitroaniline→pyrogallol; 2 - chloro - 4 - nitroaniline→1,3 - naphthalenediol; 4 - chloro - 2-nitroaniline→resorcinol; 5-nitro-o-toluidine→1,3-naphthalenediol; 2-nitro-p-toluidine→resorcinol; 2-nitro-4-trifluoromethylaniline→pyrogallol; 2,4-xylidine→resorcinol; o-anisidine→resorcinol; 5-chloro-o-anisidine→2,3-naphthalenediol; cresidine→2,3-naphthalenediol; 4-nitro-o-anisidine→2,3 - naphthalenediol; 1-naphthylamine→2,3-naphthalenediol; 2-naphthylamine→2-resorcinol; 2-amino-4,6-dichlorophenol→2,3 - naphthalenediol; 2 - amino - 5 - nitrophenol→2,3-naphthalenediol; tolusafranine (CI 50240) →2,3 - naphthalenediol; N,N - diethyltolusafranine→2,3-naphthalenediol; o-chloroaniline→resorcinol; m-chloroaniline→resorcinol; 2,5 - dichloroaniline→pyrogallol; 5-nitro - o - toluidine→resorcinol; 3 - amino - p - anisanilide→2,3 - naphthalenediol; 3 - amino - p - tolu - 2,4 - xylidide→resorcinol; 3-amino-p-anisanilide→resorcinol; 2,4,5-trichloroaniline→pyrogallol; m - amino - N - butylbenzamide→resorcinol; 5 - phenylsulfonyl - o - anisidine→2, 3 - naphthalenediol; 5 - benzsulfonyl - o - anisidine→resorcinol; 2,5 - dichloroaniline→4 - chlororesorcinol; $N^1$, $N^1$ - diethyl - 4 - methoxymetanilamide→pyrogallol; aniline→2,4 - quinolinediol; p - chloroaniline→2,4 - quinolinediol; o-nitroaniline→2,4-quinolinediol; 3-amino-p-anisianilide→2,4 - quinolinediol; 1 - amino - 3 - bromoanthraquinone→resorcinol; 2,4,5-trichloroaniline→4-chlororesorcinol; and 4-chloro-o-toluidine→resorcinol.

Disazo dyestuffs useful as intermediates in the invention include 2,4-xylidine (2 moles) ⇒ resorcinol; aniline (2 moles) ⇒ fustic extract (Maclurin and Morin CI 75240 and 75660); 2,4-dichloroaniline (2 moles) ⇒ resorcinol; 5-chloro-o-toluidine (2 moles) ⇒ resorcinol; 4-methoxy-m-phenylenediamine ⇒ fusic extract; benzidine ⇒ resorcinol (2 moles); o-toluidine ⇒ resorcinol (2 moles); 4,4'-(o-chlorobenzylidene)di-2,5-xylidine ⇒ 1,3-naphthalenediol; (2 moles); 4,4'-benzylidenedi-o-anisidine ⇒ 2,3-naphthalenediol (2 moles); and 4,4'-diaminodiphenylamine ⇒ pyrogallol.

Useful hydroxyl-containing anthraquinones include 2-bromoquinizarin, 2,3-dihydroxyquinizarin, 2-chloroquinizarin, quinizarin, 1-nitroquinizarin, 3-aminoquinizarin, 4- aminoquinizarin, 3-nitroquinizarin, ethylene propylene, 1-amino-4,5,8 - trihydroxyanthraquinone, 1,2,4,5,6 - azohydroxyanthraquinone, 1,2,4,5,6,8-azohydroxyanthraquinone and 1,4,5,8-tetrahydroxyanthraquinone.

Tertiary amines from which the quaternary ammonium salts of the invention can be made include, trimethylamine, triethylamine, triisopropylamine, tri-n-butylamine, dimethyl aniline, diethyl aniline, pyridine, 2,4-lutidine, 2,6-lutidine, 2-picoline, 4-picoline, quinoline and isoquinoline.

In preparing the dyestuffs of the invention the desired hydroxyl-containing colorant of the azo or anthraquinone series is reacted with at least one mole of epichloro- or epibromohydrin per hydroxyl group, as shown hereunder, to form the halohydrin ether.

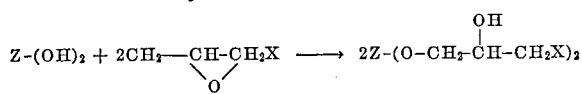

Z and X in the above equation have the values given aforesaid.

Conveniently, the reaction is accomplished by reacting an excess of epibromohydrin with the hydroxylated material at about 100° C. in the presence of a catalytic amount of base, such as piperidine. After distilling off excess epibromohydrin, the residue is dissolved in a suitable inert solvent, e.g., chloroform, shaken with aqueous hydrobromic acid to convert any glycidyl ether to the bromohydrin, and the product isolated by distilling off the solvent after separating from the aqueous layer and washing until neutral. Alternatively, there may be used an inorganic alkali, e.g., sodium hydroxide. The remainder of the preparation is similar to the procedure first detailed.

During the preparation of the halohydrin ether, it may be desirable to use the colorants containing free amino groups in the form of their acylamido derivatives in order to protect the amino group from reaction with the halohydrin and thus minimize undesirable side reactions.

The quaternary ammonium salt is formed from the halohydrin ether according to the following equation:

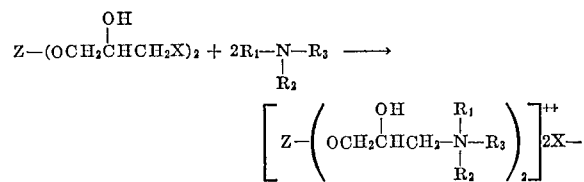

In the above equation $Z_1$, $R_1$, $R_2$, $R_3$ and X have the values given aforesaid. The reaction is conducted in a suitable solvent at a temperature between about 40° C. and the boiling point of the solvent. Useful solvents include an excess of the amine reactant, lower alkanols, such as methanol and ethanol, and dioxane. Conveniently, the reaction may be followed by testing a sample of the reaction mixture for water solubility, the reaction having gone to completion when the sample is completely soluble. Since two or more 2-hydroxy-3-halopropoxy functions may be present in the same molecule, the reaction time may be extended beyond the time when a sample is entirely soluble in water in order to be certain that all of the functions have been quaternized. Upon cooling, the product precipitates from the reaction mixture and is recovered by filtration. The dyestuff thus obtained is oven dried and is thereafter ready for use.

The new dyestuffs of the invention are especially suited for the coloration of cellulosic textile materials such as cotton, linen and viscose rayon, although they also may be effectively applied to silk, wool, nylon and the like.

The dyestuffs are applied by treating the textile material in an aqueous solution (which may be a thickened printing paste) of the dyestuff in the presence of an acid-binding agent, for example, sodium phosphate or sodium carbonate. The acid-binding agent may be added to the dye bath either prior to, simultaneously with, or after the addition of the dyestuff.

The dyestuff solution may contain commonly used dye bath adjuvants such as sodium chloride, sodium sulfate, sodium alginate, urea or water-soluble alkyl ethers of cellulose.

The printing paste may contain commonly used adjuvants, such as urea, and thickening agents, e.g., methyl cellulose, starch and locust bean gum and sodium alginate.

Dyeing in the presence of the acid-binding agent is preferably carried out at elevated temperatures, for example, at temperatures between 60° C. and the boiling point of the dyestuff solution in order to improve the exhaustion and fixation of the dyestuff.

The textile material printed with printing paste containing an acid-binding agent is preferably steamed or heated in order to fix the dyestuff on the textile material by linking the dye to the fiber.

When the acid-binding agent is applied to the textile material before or after the dyestuff, it is preferably applied by treating the fiber with an aqueous solution of the acid-binding agent, i.e., a padding technique. The aqueous solutions of acid-binding agents may also contain the common dye bath adjuvants.

Both the solution of acid-binding agent and dyestuff may be applied at room temperature or at elevated temperatures. The textile material can be dried between the two treatments if desired. It is preferred to steam cellulosic material at an elevated temperature, for example, at 100° C. or higher, for a short period of time after application of the dyestuff and acid-binding agent to fix the dyestuff on the textile material by causing the dye to react with the hydroxyl groups of the cellulose.

The above techniques may be modified by substituting for the acid-binding agent a substance which on heating or steaming generates an acid-binding agent. Such substances include alkali metal bicarbonates which on steaming yield alkali metal carbonates.

The fastness to washing or subsequent wet processing of the colorations produced using our new dyestuffs is improved by a scouring treatment, e.g., applying a hot aqueous solution of soap and sodium carbonate, followed by rinsing in hot water prior to drying.

The new dyestuffs may also be applied to silk, wool, regenerated protein, nylon and modified polyacrylonitrile textile materials by using the conventional dyeing methods for those textile materials; i.e., dyeing from weakly acid dyebath solutions, for example, dyestuff solutions containing acetic acid or ammonium sulfate at a temperature above 80° C. When dyeing proteinacous fibers in conjunction with an acidic catalyst, it is preferable to use a temperature between 80° C. and 100° C.

Our invention is further illustrated by the following examples:

*Example 1* p-Nitroaniline is diazotized and coupled into resorcinol. A mixture of 0.1 mole of the coupling product and 0.60 mole of epibromohydrin is stirred and held at 103–104° C. for six hours in the presence of a trace of piperidine. After distilling the excess epibromohydrin under vacuum, the residue is dissolved in chloroform and shaken with 48% hydrobromic acid. This treatment converts any epoxide which may have formed into the desired bromohydrin. After washing neutral with water, the solvent is distilled under vacuum and the residue is dried at 50° C. under vacuum.

A mixture of 8 g. of the bis-(bromohydrin ether) and 120 ml. of dry pyridine is stirred at the boil for 1 hour. The liquids are distilled under vacuum and the residue is triturated with acetone. The solid product is filtered off, washed well with acetone, and dried at 50° C. There is obtained a brownish-yellow colored dye.

Example II

A swatch of 80 x 80 print cloth is padded with a 1% solution of the dye prepared in Example I. After an intermediate drying, the cloth is padded with an aqueous solution containing 20 g. of sodium carbonate and 200 g. of urea per liter. After an intermediate drying, the cloth is steamed for 60 seconds. After rinsing and soaping, a dyeing is obtained which is stable to hot alkaline soap solution, thereby indicating chemical attachment of the dye to the fiber.

Example III p-Nitroaniline is diazotized and coupled into pyrogallol. By condensing this product (C.I. 11955) with epibromohydrin according to the procedure in Example I, the corresponding tris-(3-bromo-2-hydroxypropoxy) compound is obtained.

A mixture of 0.010 mole of the tris-(bromohydrin ether), 75 ml. of 95% ethanol, and 15 ml. of dimethylaniline is stirred under reflux for 20 hours. After distilling the volatile components under vacuum, the residue is triturated with acetone, the solid product is filtered off, washed well with acetone, and dried at 50° C. under vacuum. There is obtained a brown colored dye.

Example IV

The procedure of Example II is followed using a 1% solution of the dye of Example III. The fastness of the dyeing to soaping is once again much greater than that of the colorant from which the new dyestuff is prepared, thereby indicating fiber reactivity.

Example V

The procedure of Example I is repeated using aniline→resorcinol (C.I. 11920) as a starting material. There is obtained in good yield an orange-red dye.

Example VI

The procedure of Example I is repeated using 2-amino-4-nitrophenol→resorcinol as a starting material. There is obtained in good yield a red dye.

Example VII

The procedure of Example I is repeated using aniline→2,4-quinolinediol (C.I. 12770) as a starting material. There is obtained in good yield a yellow dye.

Example VIII

The procedure of Example I is repeated using (2 m.) 2,4-xylidine→ resorcinol (C.I. 20020) as a starting material. There is obtained in good yield an orange dye.

Example IX

The procedure of Example I is repeated using 2-methoxy-5-nitroaniline→resorcinol as a starting material. There is obtained in good yield a red-brown dye.

Example X

Quinizarin is condensed with epibromohydrin according to the procedure in Example I to form the corresponding bis-(bromohydrin ether).

A mixture of 0.030 mole of the bis-(bromohydrin ether), 250 ml. of 95% ethanol, and 60 ml. of quinoline is stirred under reflux for 20 hours. After distilling off the liquids under vacuum, the residue is triturated with acetone and the solid is filtered off, washed with acetone, and dried under vacuum at 50° C. There is obtained a yellow colored dye.

Example XI

The procedure of Example II is followed using a 1% solution of the dye of Example X. The fastness of the dyeing to soaping is once again much greater than that of the colorant from which the new dyestuff is prepared, indicating the fiber reactivity of the dye of the invention.

Example XII 2-nitroquinizarin is condensed with epibromohydrin to form the bis-epibromohydrin, according to the procedure in Example I.

A mixture of 11.2 g. (0.020 mole) of the bis-bromohydrin, 200 ml. of 95% ethanol, and 80 g. of tri-n-propylamine is stirred under reflux for 23 hours. After distilling off volatile materials under vacuum, the residue is triturated with acetone, filtered off, washed well with acetone, and dried at 50° C. under vacuum. The orange-yellow colored product weight 14.8 g.

Example XIII

The procedure of Example II is followed using a 1% solution of the dye of Example XII. The fastness of the dyeing to soaping is once again much greater than that of the colorant from which the new dyestuff is prepared.

Example XIV

The procedure of Example XII is repeated using alizarin as a starting material. There is obtained in good yield a yellow dye.

Example XV

The procedure of Example XII is repeated using 3-nitroalizarin as a starting material. There is obtained in good yield a weak yellow-orange dye.

Example XVI

The procedure of Example XII is repeated using 1,4,5,8-tetrakis(3-bromo-2-hydroxypropoxy)anthraquinone as the bromohydrin ether. There is obtained in good yield a red-brown dye.

Example XVII

The procedure of Example XII is repeated using 3-aminoalizarin as a starting material. There is obtained in good yield a weak yellow-brown dye.

Example XVIII

The procedure of Example XII is repeated using 1,4-bis(2-bromo-2-hydroxypropoxyethylamino)-5,8-bis(3-bromo-2-hydroxypropoxy)anthraquinone as a starting material. There is obtained in good yield a blue dye.

Example XIX

The procedure of Example XVIII is repeated substituting an equimolar amount of 2,6-lutidine for the tri-n-propylamine. There is obtained in good yield a blue dye.

Example XX

The procedure of Example XVIII is repeated substituting an equimolar amount of isoquinoline for the tri-n-propylamine. There is obtained in good yield a blue dye.

Example XXI

The procedure of Example XVIII is repeated substituting an equimolar amount of 4-picoline for the tri-n-propylamine. There is obtained in good yield a blue dye.

Examples XXII–XXXIV

The dyes of Examples V–IX and XIV–XIX are tested for fiber reactivity according to the procedure of Example II. In each case, after rinsing and soaping, a dyeing is obtained which is stable to hot alkaline soap solution.

We claim:

1. A dyestuff of the formula:

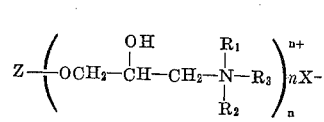

wherein Z is a water-insoluble aromatic dyestuff moiety selected from the group consisting of azo and anthraquinone; $R_1$, as an individual substituent, is a member selected from the group consisting of phenyl and lower alkyl; $R_2$, as an individual substituent, is lower alkyl; $R_3$, as an individual substituent, is lower alkyl; and $R_1$, $R_2$ and $R_3$ taken collectively with the N atom to which they are attached, represent the residue of an azaaromatic nucleus selected from the group consisting of pyridine, lower alkyl pyridines, quinoline, and isoquinoline; $n$ is an integer having a value of 2 to 4; and X is a member selected from the group consisting of chlorine and bromine, the oxygen atom of at least two of said $n$ groups being linked directly to one aromatic ring of the Z moiety.

2. A dyestuff of claim 1 wherein Z is azo, $R_1$, $R_2$ and $R_3$ are lower alkyl, $n$ is two, and X is bromine.

3. A dyestuff of claim 1 wherein Z is azo, $R_1$, $R_2$ and $R_3$ are taken collectively to form a pyridine nucleus, $n$ is two, and X is bromine.

4. A dyestuff of claim 1 wherein Z is anthraquinone, $R_1$, $R_2$ and $R_3$ are lower alkyl, $n$ is two, and X is bromine.

5. A dyestuff of claim 1 wherein Z is anthraquinone, $R_1$, $R_2$ and $R_3$ are lower alkyl, $n$ is four, and X is bromine.

References Cited by the Examiner

UNITED STATES PATENTS

| | | | |
|---|---|---|---|
| 2,099,525 | 11/1937 | Krzikalla et al. | 260—56 X |
| 2,140,944 | 12/1938 | Schirm | 260—156 |
| 2,900,216 | 8/1959 | Schwechten | 260—567.6 |

CHARLES B. PARKER, *Primary Examiner.*

JOSEPH P. BRUST, *Examiner.*

FLOYD D. HIGEL, *Assistant Examiner.*